Patented Dec. 30, 1947

2,433,531

UNITED STATES PATENT OFFICE 2,433,531

MILK FILTER

John F. Ryan, Walpole, Mass., assignor to The Kendall Company, Walpole, Mass., a corporation of Massachusetts No Drawing. Application July 30, 1940, Serial No. 348,449

12 Claims. (Cl. 210—203)

This invention relates to filters of the type designed primarily for use in filtering milk on the farm. It is more especially concerned with the filtering sheets or disks used in filters of this general character, although they obviously may be used in filtering other fluids.

As the milk is collected in pails, cans, or other containers used in connection with the milking operation, it is poured through a filter disk supported in a metal strainer which usually fits into the top of a large can designed to be sent to the pasteurizing machine or to some receiving center. The object of the filtering operation performed at this time is to remove what may be referred to as the gross dirt. It is not designed to remove bacteria nor, of course, dissolved impurities, but it is intended to remove dirt collected incidental to the milking operation.

In general, it may be stated that satisfactory filter disks should have the following qualities:

(1) Speed: The filtering rate of the disks should be high per unit of area and mass.

(2) Capacity: The disks should be capable of filtering a relatively large volume of milk per unit of area without slowing down greatly or clogging.

(3) Efficiency: The disks should remove all the visible dirt or sediment.

(4) Cleanliness: The disks should be relatively free from bacteria or contaminating material of any kind.

(5) Convenience: The disks should be convenient to use.

The common commercial forms of filter disks intended for this general purpose are made of carded cotton of the same general types used in the manufacture of cotton yarn, this material being lightly sized with starch, dextrine, or the like, to give it cohesion and to smooth down the surfaces so that the disks can be easily separated after being stacked or packed for shipment. Usually in the manufacture of these disks the cotton is given a light kier-boil so as to leave much of the natural wax on the fibers and thus to retain a certain degree of their natural non-absorbency. The filter disks may be either plain or surfaced on one or both sides with gauze, according to the need for added strength or the demands of the trade.

While these disks as made commercially fulfil the last three requirements above designated fairly well, if properly used, considerable fault is found with them because of their failure to meet the first two requirements satisfactorily, namely, speed and capacity. Such failure is largely due to the fact that the cotton fibers mat down very soon after the filtering operation starts. Although the kier-boiling treatment does render them non-absorbent for a brief period, this characteristic disappears relatively early in the filtering process, after which the fibers quickly mat down with a consequent decrease in the filtering rate. Moreover, the nature of the treatment designed to produce the required degree of non-absorbency varies greatly with successive batches of cotton, and this fact also is responsible for variations in filtering speed. When the filtering process becomes too slow, the farmer is very likely to pick up the strainer and drop it in an attempt to speed up the rate of flow, and this action sometimes results in rupturing the filter due to its very low wet strength, thus defeating the whole purpose of the filtering operation.

A further objection to these prior art filter disks is the fact that the sizing materials are water-soluble and thus introduce an undesirable element into the milk.

The present invention provides a novel filtering unit which fulfills the above enumerated requirements and which avoids substantially all of the objections above mentioned while still maintaining the expense of the filtering unit within entirely reasonable limits.

I have found that very superior milk filter disks can be made from one or more kinds of wiry, resilient textile fibers, particularly when so selected or processed as to be less susceptible to the softening influence of water than are the partially bleached fine cotton fibers ordinarily used for milk filters. Among the fibers which are suitable to my purpose are those made from vinyl resins, cellulose esters, and wool fibers. I prefer, however, to use those grades of cotton which have a harsh rough feel, these varieties being valuable in a milk filter because of the resistance which the fibers present to matting down and their consequent tendency to maintain the original porosity and open structure of the filtering sheet. Such varieties as China and Rough India cottons have these characteristics and certain of the Java and Peruvian cottons also have them to a somewhat lesser degree. At the present time the Rough India grade is preferred for economic reasons. Milk filters made from the common American cottons have a slimy feel after the filtering operation has been completed, something like that of a piece of wet chamois, whereas those made of Rough India cotton feel more like a piece of woolen felt. The resilience of these fibers responsible for this difference is valuable in maintaining both the initial speed and capacity of a filter sheet by preventing a matting down of the fibers.

If, in addition to using this type of cotton, the cotton is treated to improve its resistance to wetting, its natural resilience is retained for a longer time and the characteristics of a filter made from it are correspondingly improved. As above stated, prior art cotton filtering disks have been given only a light kier boil so as to leave a sufficient proportion of the natural waxes in them to retain a considerable part of their non-absorbency. This, however, has not proved to be a satisfactory treatment due to variations in the natural wax content of the fibers and vagaries of kier boiling operations. One of the objects of this invention, therefore, has been so to treat the cotton of which the disks or certain layers, at least, of the disks are made, that the degree of absorbency will be definitely controlled and fixed at the desired value.

This, I find, can be accomplished by kier boiling and bleaching the cotton in essentially the same manner as that practiced in producing absorbent cotton, thus effecting a very thorough removal of the wax, and later adding a water repellant substance to the fiber. Cotton subjected to the light kier boil commonly employed in making milk filters is not very thoroughly scoured, the process being carried on at atmospheric pressures and without soap or emulsifying agents. Consequently, it is likely to contain in the neighborhood of from .3% to .4% of natural wax and to be only partially cleaned up. The thorough kier boil and bleach to which the cotton is here subjected gives a product exceptionally clean and free from dirt, shell, and other foreign materials and leaves only about .1% of wax in it.

After the cotton has been prepared in this manner, a predetermined quantity of any suitable water repellant material is added to it, the quantity being determined by the degree of non-absorbency desired. The preferred method of accomplishing this result is to apply a dilute aqueous emulsion of paraffin wax to the cotton, either by spraying it on the cotton before drying or applying it thereto in any other convenient manner. For ease in handling, the emulsion is diluted in water to about 1% solids and is applied while the cotton is in the bleach tub. If sprayed, the consistency may be increased to 40% or 50%. In any event, enough emulsion is so applied as to give a finished product containing from, say, .3% to 1.5% of solid paraffin. Preferably the paraffin content is between .5% and 1.0%, and the control can be held within very narrow limits. This is considerably more than that customarily used and this fact materially improves the filtering characteristics of the carded webs made from the cotton so prepared. The method just described produces a highly uniform distribution of the paraffin on the fibers. Moreover, this material is a very satisfactory water repellant agent for use in filter disks because it is non-soluble in milk, is clean, stable, inexpensive, and easily controlled.

It is important to have the outer layers or plies of carded cotton of which the disk is made up of such a nature that they will serve as confining or covering plies for the inner layers. For this purpose I make carded layers of Rough India cotton or some other harsh type of cotton treated in the manner above described and unite the fibers at spaced points into a unified, coherent, but highly porous mass, by using some waterproof adhesive or binding medium applied in discrete and separated particles so that the porosity and permeability of the web to water and milk will not be reduced to an undesirable degree. Some of the synthetic resinous materials are suitable for this purpose, such as cellulose acetate, ethyl cellulose, vinyl chloride and vinyl acetate and copolymers of the same, polyamides such as nylon, and the like. Rubber latex and synthetic rubbers also can be used. These materials can be dispersed in some volatile solvent and sprayed on the carded web.

The preferred method of incorporating this binder material in the fibrous web, however, is to mix it with the cotton while the binder is in a fiber form. Such binders as cellulose acetate, ethyl cellulose and vinyl polymers or "Vinylite" are obtainable in this form, and some suitable proportion, say 2% to 10% of these binder fibers may be mixed with the cotton fibers before the picking operation. When this material is run through a picker lapper and made into a lap which later is fed to a card, a carded web is produced in which the binder fibers are distributed very uniformly. Later this web, or preferably the assembly of carded webs of which the filter sheet is to be made, are run through a hot calender, the rolls of which are heated sufficiently to soften the binder fibers and make them adhere to or bond with the cotton fibers thus unifying the entire mixed fiber structure. This produces a web having both a high wet and dry strength while still having ample porosity. The softening point also may be lowered through the use of suitable plasticizers. The best binding material which I have found for this purpose is plasticized cellulose acetate fibers. Four to five percent. of them in the fibrous mixture above described produces a very satisfactory material for use as a binder in the manufacture of milk filters.

Since plasticizers are generally incorporated in the composition of these fibers, the nature of the plasticizer used is important, particularly because many of the common plasticizers have toxic properties, or are otherwise unsuitable for use in a milk filter. That class of plasticizers known as Santicizers are particularly well adapted for use in cellulose acetate fibers which are to form a constituent of a milk filter disk. Santicizer E-15 is preferred. Chemically it is ethyl-phthalyl-ethyl-glycolate. Other members of this group of Santicizers which are also useful for this purpose are the corresponding compounds in which the ethyl radical is replaced by a methyl or butyl radical. Fibers composed of cellulose acetate containing approximately 30% of one of these plasticizers have proved very satisfactory.

Such materials as those above described give a high filtering rate and good capacity and a filter made exclusively from these constituents is satisfactory for some purposes. I prefer, however, to include in the filter sheet one carded web of a soft grade of bleached cotton because of the tendency of these fibers to swell and mat together and thus form an effective barrier to the passage through the disk of fine sediment which might find its way through the layers of harsh or Rough India cotton.

A milk filter disk which has proved very satisfactory is made by superposing carded webs of cotton in the following order:

(1) A single carded web comprising 4% of plasticized cellulose acetate fiber and 96% of waxed Rough India cotton.

(2) and (3) Two carded webs composed of waxed Rough India cotton prepared as above described.

(4) A single carded web of bleached, relatively non-absorbent, soft, domestic cotton or any similar soft type of fiber.

(5) and (6) The same as (2) and (3).

(7) The same as (1).

This plied web is fed through a calender, heated to a sufficient temperature to soften the cellulose acetate fibers, say for example 350° to 400° F. A normal calendering pressure is used and a suitable speed is, say, 12 to 18 yards per minute. This material is rolled out into flat sheets from which the disks are cut out with cutting dies. Such disks are made of various diameters to fit into the commercial sizes of strainers. They vary in thickness from in the neighborhood of one-eighth to one-quarter of an inch when uncompressed, this variation depending upon the number of layers used in the composition of the filter and whether it is of the single faced or double faced variety.

It will be observed that each of these disks includes a center ply of a soft bleached cotton, thicker layers at opposite sides of it of a harsh type waxed cotton, and confining or covering plies at the opposite sides of this central assembly, these covering plies being unified by the presence of the cellulose acetate fibers.

If desired, the web from which these disks are cut may be surfaced on one or both sides with bleached cotton gauze of, say, 14 x 10 or 18 x 16 count. Whether or not such reinforcement is used will depend entirely on the nature of the service for which the material is to be used.

The practical use of filter sheets made in accordance with this invention and the multitude of comparative tests made with prior art filter disks have demonstrated the superiority of those produced in accordance with this invention. Very exhaustive tests have been directed particularly to relative speeds and capacities.

In this connection it should be borne in mind that filtering speed is affected by factors other than the structure of the disk itself, such as the temperature and butterfat content of the milk, and variations in the consistency of the milk caused by seasonal variations in the feed of the herd. There is also some variation in disks produced by the same methods. In making these comparative tests, applicant has endeavored to run them under absolutely parallel conditions. Since the six inch size is largely used on the smaller farms and the eight inch size on the larger farms where hundreds of gallons of milk are filtered daily, these two being by far the most common sizes used, the comparative tests as to speed and capacity have been run chiefly with them.

These tests have demonstrated that disks produced in the manner above described have a filtering rate from about two to approximately four times as high as that of the common milk filter disks on the market. For example, in a series of tests of eight inch double-faced disks made in accordance with this invention in comparison with similar disks of the best of the commercial products which we have been able to find, the average time required to filter ten gallons of milk was two minutes and forty seconds with the prior art disks as against one minute and twenty seconds with applicant's disks. This was an average of many parallel tests. This is an important practical advantage and it is realized with a thoroughness of sediment removal and a degree of cleanliness at least equal to that of the best of the prior art filters which we have been able to obtain. In this same series of tests the average spread between the slowest and the fastest of the commercial disks was six minutes, while for applicant's disks the average spread was less than half that figure.

In making comparative tests of capacity the results are fairly indicated by the following example with six inch plain disks prepared in accordance with this invention tested in comparison with corresponding disks of the commercial brand above referred to. Ten gallons of milk were run through each disk. Those prepared according to this invention averaged two minutes and twenty seconds for this quantity while the competitive disks averaged six minutes for the same volume. When a second ten gallons was poured through the same disks, all of applicant's disks filtered the second ten gallons readily, the average time of filtration being three minutes and ten seconds. Four out of six of the competitive disks clogged in filtering the second ten gallons of milk poured into them, necessitating replacement of the disks before filtration could be continued.

In addition, the all-fiber disks (not reinforced by gauze) made by this invention have much greater wet strength than that of similar disks of the character commercially available. This is largely due to the nature of the union of the fibers to each other in the confining or covering plies.

A further advantage of applicant's filter sheet is that it contains no sizing or other water-soluble binder constituent. Where bonding of the fibers is required, in addition to the mechanical interlocking of the fibers with each other, it is here produced by a direct adhesion or welding of fibers to each other, as above described in connection with the method of making the outer or covering plies of this product. Since this bonding medium is water-insoluble and is in the form of fibers, or at least in discrete particles, it offers less resistance to the flow of fluids, and this resistance is unaffected by any breaking down or solution of the binding medium. Moreover, the introduction of any objectionable constituent into the milk is avoided. While the quantity of any such ingredient so introduced during a single filtering operation might be harmless, there is always the danger that any such substance, if taken over a period of time, would produce cumulative toxic effects, and great care has been exercised in making this product to eliminate any such possibility.

While I have herein described a preferred embodiment of my invention, it should be understood that the manufacture of these filter units necessarily varies in some particulars as, for example, the number of plies used, with the requirements of the material to be filtered. Also, these filter disks are customarily made in either single-faced or double-faced forms, and either type may be made in accordance with this invention. Although the filter sheets or disks above described have been devised primarily for use in filtering milk, it is obvious that they have characteristics which are also valuable in filtering other fluids.

Having thus described my invention, what I desire to claim as new is:

1. A filter sheet comprising a series of superposed layers of carded fibers, including a relatively thick layer of unbonded fibers, and additional unwoven layers at opposite sides of it having fibers which are bonded together by discrete particles of waterproof binder serving to unify said additional layers, said sheet being adapted to maintain substantial porosity and open-structure during filtering of liquid therethrough.

2. A filter sheet comprising a series of superposed layers of carded fibers, including a relatively thick layer of unbonded fibers, and additional unwoven layers at opposite sides of it composed of heterogeneously intermingled fibers united at a multiplicity of points by water-insoluble bonds leaving intervening portions unbonded, said sheet being resistant to matting down during filtering of liquid therethrough.

3. A filter sheet comprising a series of superposed layers of loosely intermingled cellulose fibers, including a middle assembly comprising a layer of soft fibers and other layers comprising wiry, resilient fibers, and additional layers at opposite sides of said assembly, the fibers of said additional layers being united into a coherent structure by means of discrete particles of a waterproof binder distributed throughout a large part, at least, of said additional layers.

4. A filter sheet comprising a series of superposed layers of loosely intermingled cellulose fibers, including a middle assembly comprising a layer of soft fibers and other layers both above and below said layer of soft fibers, said other layers including wiry, resilient fibers, and additional layers at opposite sides of said assembly, each of said additional layers comprising a mixture of cellulose fibers and thermoplastic waterproof binder fibers bonded by the latter fibers into a highly porous coherent sheeted structure, the cellulose fibers predominating.

5. A filter sheet comprising a series of superposed layers of loosely intermingled fibers, certain of said layers comprising heterogeneously disposed wiry resilient cellulosic fibers containing a sufficient percentage of an added water-repellant material to make the fibers substantially non-absorbent, whereby they resist the tendency to mat together and the initial filtering speed and capacity of the filter sheet is maintained throughout a substantial period of filtering time.

6. A filter sheet comprising a series of superposed layers of carded fibers, including highly porous foraminous outside layers, the fibers of which are united by a waterproof thermoplastic fibrous bonding medium dispersed substantially throughout said outside layers, and inside layers of wiry resilient fibers.

7. A filter sheet according to preceding claim 1, in which at least one of said layers is composed chiefly of wiry resilient cellulosic fibers containing only approximately a sufficient percentage of an added water-repellant material to make the fibers substantially non-absorbent.

8. A filter sheet according to preceding claim 6, in which at least one of said layers contains from .3% to 1.5% of a waterproof wax coating the fibers.

9. Filter media characterized by marked wash resistance, comprising a sheet-like structure of loosely associated fibers, the fibers near and at the surface of the sheet being physically bonded at their points of contact by a substance having the property of being cold water non-dispersible to provide a wash-resistant surface, the interstices between the points of contact of said fibers at and near the surface of said sheet and the interior fibers of said sheet being relatively free of said bonding substance, said sheet-like structure being resistant when wet to matting whereby fluids such as milk may be freely filtered through said sheet.

10. Filter media characterized by marked wash resistance, comprising a sheet-like structure of loosely associated fibers, the fibers near and at the surface of the sheet being physically bonded at their points of contact by a substance having the property of being cold-water non-dispersible to provide a wash-resistant surface, the interstices between the points of contact of said fibers at and near the surface of said sheet and the interior fibers of said sheet being sufficiently free of bonding and a substantial portion of the fibers in the interior of the sheet being substantially non-absorbent, so that fluids such as milk may be freely filtered through said sheet.

11. Filter media characterized by marked wash resistance, comprising a sheet-like structure of loosely associated fibers, the fibers near and at the surface of said sheet being physically bonded at their points of contact by a substance having the property of being cold-water non-dispersible to provide a wash-resistant surface leaving intervening portions of said fibers at and near the surface of said sheet unbonded, said sheet-like structure being adapted to maintain sufficient porosity and open structure when wet so that fluids such as milk may be freely filtered therethrough.

12. Filter media characterized by marked wash resistance, comprising a sheet-like structure of loosely associated fibers, the fibers near and at the surface of the sheet being physically bonded at their points of contact by from 2 to 10% of a substance having the property of being cold-water non-dispersible to provide a wash-resistant surface, the interstices between the points of contact of said fibers at and near the surface of said sheet and the interior fibers of said sheet being relatively free of said bonding substance, said sheet-like structure being resistant when wet to matting down whereby fluids such as milk may be freely filtered through said sheet.

JOHN F. RYAN.

REFERENCES CITED

The following references are of record in the file of this patent:

UNITED STATES PATENTS

| Number | Name | Date |
|---|---|---|
| 336,799 | Derham | Feb. 23, 1886 |
| 855,981 | Kneuper | May 21, 1907 |
| 956,832 | Seitz | May 3, 1910 |
| 1,006,070 | Durbrow | Oct. 17, 1911 |
| 1,222,100 | Hanson | Apr. 10, 1917 |
| 1,411,975 | Matson | Apr. 4, 1922 |
| 1,693,890 | Duclaux | Dec. 4, 1928 |
| 1,955,158 | Wells | Apr. 17, 1934 |
| 2,007,753 | Ericson | July 9, 1935 |
| 2,039,312 | Goldman | May 5, 1936 |
| 2,084,582 | Goldman | June 22, 1937 |
| 2,103,572 | Wells | Dec. 28, 1937 |
| 2,113,122 | Reed | Apr. 5, 1938 |
| 2,148,708 | Orr | Feb. 28, 1939 |
| 2,161,766 | Rugeley et al. | June 6, 1939 |
| 2,236,892 | Broeman | Apr. 1, 1941 |
| 2,269,725 | Malanowski | Jan. 13, 1942 |
| 2,288,426 | Stack | June 30, 1942 |
| 2,324,838 | Harz | July 20, 1943 |

FOREIGN PATENTS

| Number | Country | Date |
|---|---|---|
| 19,172 | Great Britain | Aug. 26, 1911 |
| 174,174 | Great Britain | Jan. 18, 1922 |
| 249,202 | Great Britain | Mar. 17, 1926 |
| 291,213 | Great Britain | May 31, 1928 |
| 393,592 | Great Britain | June 6, 1933 |
| 416,430 | Great Britain | Sept. 14, 1934 |